Dec. 23, 1947. R. G. TURNER 2,433,174
ELECTRIC WEFT DETECTING SYSTEM FOR LOOMS
Filed March 18, 1946
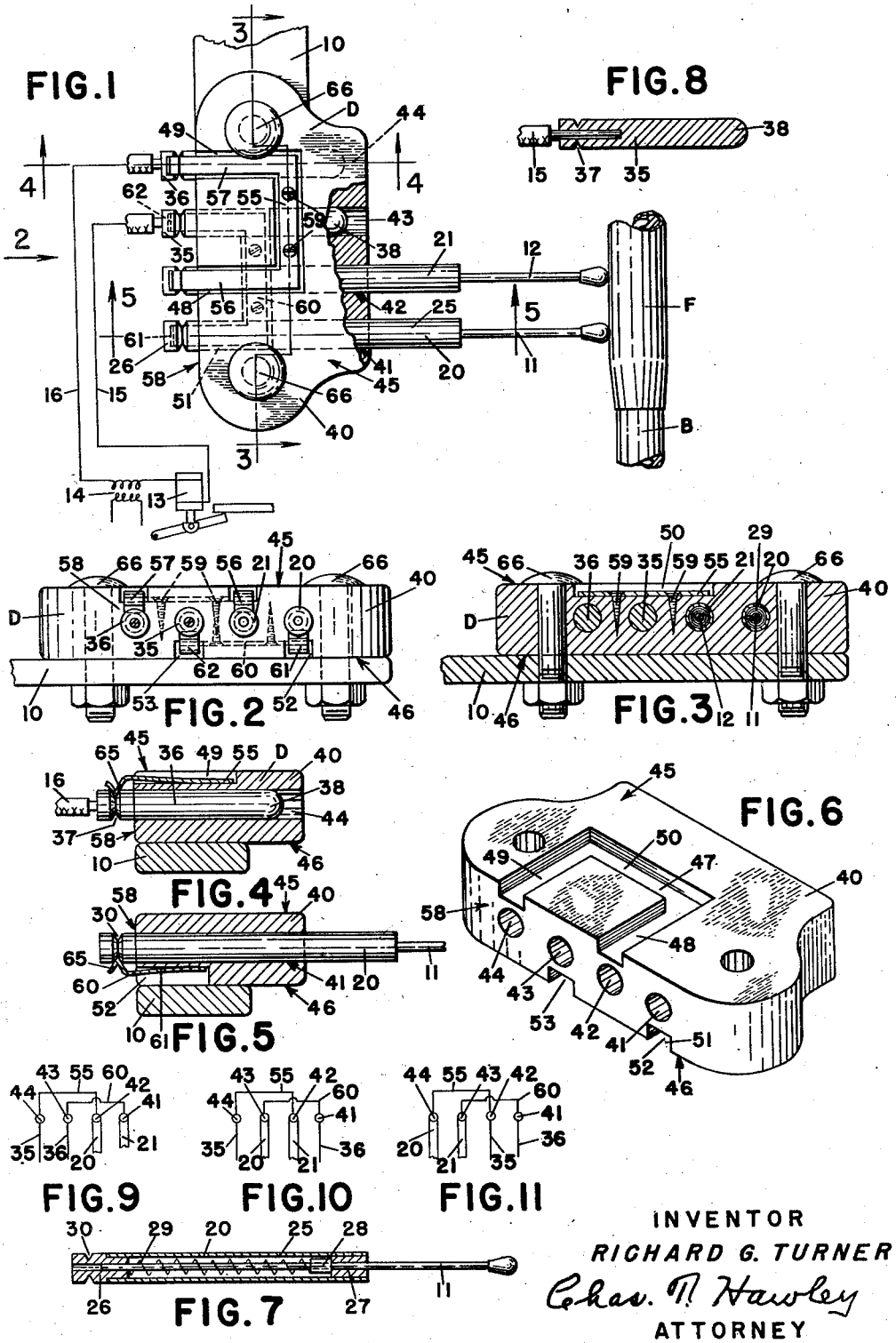
INVENTOR
RICHARD G. TURNER
Chas. N. Hawley
ATTORNEY Patented Dec. 23, 1947

2,433,174

UNITED STATES PATENT OFFICE 2,433,174

ELECTRIC WEFT DETECTING SYSTEM FOR LOOMS

Richard G. Turner, Worcester, Mass., assignor to Crompton & Knowles Loom Works, Worcester, Mass., a corporation of Massachusetts Application March 18, 1946, Serial No. 655,101

16 Claims. (Cl. 139—273)

1

This invention relates to improvements in electric weft detecting systems for looms and it is the general object of the invention to provide such a system which can be used with unit type detectors.

A well-known type of electric weft detector employs a pair of detector fingers slidably mounted in a base and having contact with a metal ferrule on the bobbin being detected when the bobbin is depleted of weft. Shuttles carrying such bobbins are likely to be of different lengths so that the detector fingers will be in one position when cooperating with a short shuttle but in a different position when used with a longer shuttle. It is an important object of my present invention to provide an electric weft detecting system so constructed that it can mount unit detectors in several different positions for cooperation with shuttles of different lengths.

It is another object of my present invention to provide electric weft detector means including a plug-like detector unit which can be readily inserted into a holder manually and be held therein in proper detecting position. In this feature of my invention a damaged unit can be readily removed and replaced by a manual operation without disturbing any part of the detecting circuit or the supporting base.

In electric weft detectors it is necessary to provide some means for electrically connecting the detector fingers with the external loom controlling circuit. It is another object of my present invention to provide an electric detector with a base having a plurality of sockets each provided with a contact and wherein the sockets and their contacts are so arranged that the detector units can be placed in any two adjacent sockets and plug-like terminals for the external circuit can be placed in other sockets by a simple manual operation requiring no tools. Thus, in a base provided with four sockets it is possible to have the unit detectors arranged in three different positions relatively to the base, and no matter what these positions are, so long as the detector units are in adjacent sockets, the detector circuit plugs can be placed in the remaining two sockets with assurance that the circuit will be closed when the detector fingers engage the ferrule on a bobbin.

It is another object of my present invention to provide an improved detector unit comprising essentially a tube, a detector finger slidably mounted therein, and a bearing or the like for the finger constructed to have holding and electric contacting relation with respect to a resilient electrode on the aforesaid base.

2

With these and other objects in view which will appear as the description proceeds, my invention resides in the combination and arrangement of parts hereinafter described and set forth.

In the accompanying drawings, wherein a convenient embodiment of my invention is set forth, Fig. 1 is a plan view partly in section showing a weft detecting system made according to my present invention and showing the detector units in two adjacent sockets at one end of the detector, the detecting circuit being indicated diagrammatically, Fig. 2 is a front elevation looking in the direction of arrow 2, Fig. 1, Fig. 3 is a vertical transverse section on line 3—3 of Fig. 1, Figs. 4 and 5 are vertical longitudinal sections on lines 4—4 and 5—5, respectively, of Fig. 1, Fig. 6 is a perspective view of the base made of insulating material for holding certain of the electrical parts of the detecting system, Fig. 7 is a longitudinal section through one of the detecting units, Fig. 8 is a longitudinal section through one of the wire plug terminals, and Figs. 9 to 11 are diagrammatic views showing different arrangements of the detector units and wire plug terminals with respect to the detector base.

Referring particularly to Fig. 1, the detector unit designated at D is supported on a bracket or the like 10 preferably mounted so that it can be moved forwardly in the loom at the time of a weft replenishing operation. The detector is provided with two electric detector fingers 11 and 12, which are adapted for engagement with a ferrule F on a bobbin B during a detecting operation if the weft of the bobbin is depleted. Under these conditions the circuit shown diagrammatically in Fig. 1 will be closed to energize a solenoid 13 by electric power derived from a transformer 14. The circuit includes wires 15 and 16 which will be described in more detail hereinafter. Whenever the solenoid 13 is energized there will be initiated a change in loom operation, such as replenishment either of a shuttle or a bobbin, or loom stoppage.

The detector D is provided with two detector units 20 and 21 each complete in itself and since they are alike unit 20 only will be described in detail with reference to Fig. 7. A metallic tube 25 is provided with front and back bearings 26 and 27, respectively, held in any approved manner in the front and back ends of the tube. These bearings have slidably mounted therein the aforesaid finger 11 which is provided with a shoulder or collar 28 secured to or rigid therewith. A light compression spring 29 surrounds the finger 11 and is located within the tube between the front bearing 26 and the shoulder 28 and acts normally to hold the detector finger in rearward detecting position. The forward part of bearing 26 is provided with a V-groove or the like 30 for a purpose to be described. All the parts of the detector unit are preferably metallic and in electric contact with each other, although for certain features of my invention it will be sufficient if the front bearing 26 and finger only are metallic.

The wires 15 and 16 are provided, respectively, with plug terminals 35 and 36 which are of cylindrical form and of the same diameter as the tube 25. These terminals 35 and 36 are alike and as indicated in Fig. 8 are secured to their corresponding wire 15 or 16. The forward end of the terminal is provided with a V-notch 37 similar to notch 30 of the detector unit, while the rear end of the plug terminal may be rounded as at 38.

The detector units and the wire terminals are supported by and fitted into a detector base 40 made of insulating material and of the general form shown more particularly in Fig. 6. Extending through the base are four holes, sockets, or bores 41, 42, 43 and 44. These holes are parallel and of a proper diameter to establish close fitting relation with respect to the detector units and plug terminals. The axes of the holes all lie preferably in a horizontal plane.

The base 40 has top and bottom surfaces 45 and 46, respectively, which are parallel and equally spaced from the horizontal plane passing through the axes of the bores 41—44. The top surface 45 as shown in Fig. 6 is formed with a recess 47 having parallel spaced side slots 48 and 49 connected by a transverse slot 50. The slots 48 and 49 are preferably over the holes 42 and 44. In similar manner the bottom surface 46 is provided with a recess 51 formed similarly to recess 47 and having parallel slots 52 and 53 which are under the holes 41 and 43. The slots 48 and 49 of the top surface 45 are staggered with respect to the slots 52 and 53 of the bottom surface 46.

Located in the top slot 47 is an electrode 55 having electrode prongs 56 and 57 located respectively in slots 48 and 49 and projecting over the holes 42 and 44 and beyond the forward vertical face 58 of block 40. This electrode 55 is held in any approved manner in the recess 47 as at 59. In similar manner a bottom electrode 60 is in the bottom recess 51 and has electrode prongs 61 and 62 located respectively in slots 52 and 53. These electrode prongs extend forwardly of the front wall 58 as do the previously described electrode prongs. Each prong is provided with a V-shaped detent 65 which points downwardly for electrode prongs 56 and 57 and upwardly for electrode prongs 61 and 62. These detents are all at the same distance from the front wall 58 and the bottom electrode 60 may be held to the base 40 in any approved manner similar to that shown for the top electrode.

The electrode prongs perform the dual function of mechanically holding in fixed position on base 40 both the detector units and wire terminals, and establishing electric connection with them. As shown in Fig. 1 the detector units 20 and 21 are in the holes 41 and 42, respectively, unit 20 being in electric contact with electrode prong 61 and electrode 60, and unit 21 being in contact with electrode prong 56 and electrode 55. The wire terminal plugs 35 and 36 are located respectively in the holes 43 and 44, one having contact with one of the electrodes and the other having contact with the other electrode. When assembled as shown in Fig. 1 the base is secured to the support 10 by bolts 66.

Detector finger 11 is connected through electrode 60 to wire 15, while detector finger 12 is connected through electrode 55 to wire 16. Whenever the detector fingers are electrically connected as already described the solenoid 13 will be energized by a circuit which includes the electrodes 55 and 60.

As already mentioned, it may be desirable to use the detector with shuttles of different lengths, in which event the detector units 20 and 21 can be shifted from the positions shown in Figs. 1 and 9 to those shown either in Fig. 10 or Fig. 11. In Fig. 10 the detector units 20 and 21 are indicated as occupying the position corresponding to holes 42 and 43 and they will be connected respectively to the electrodes 55 and 60. Under these conditions the terminal plugs for the wires will be in holes 41 and 44 and each terminal will be in electric contact with a different electrode. Likewise, Fig. 11 suggests that electrodes 20 and 21 can be located in holes 43 and 44, while the wire terminals are in the holes 41 and 42. Here again the detecting units will be in electric contact with different electrodes and this will also be true of the wire plug terminals. It will thus be seen that the detector units can be located in any two adjacent holes 41—44 and the wire terminal plugs located in the other holes, and that in each setting a proper circuit will exist through the detector or closure of the external circuit when fingers 11 and 12 are electrically connected. The electrode prongs are resilient and for this reason it is possible to interchange the detector units and wire terminal plugs as already mentioned by a simple manual operation requiring no tools.

From the foregoing it will be seen that I have provided a simple form of electric weft detector system employing unit detectors which are shiftable along the length of the detector base 40 so that they can occupy different pairs of adjacent sockets to cooperate with shuttles of different lengths. It will also be seen that so long as the detectors are placed in adjacent holes or sockets the wire terminal plugs can be placed in the remaining holes and a proper circuit will be established through the detector. Furthermore, the electrode prongs are resilient and permit manual insertion and removal of the detector units and the wire terminals, and they serve the dual function of positioning the detector units and establishing electric contact with them. Also, it will be seen that I have provided an improved detecting unit of the plug type which can be readily manipulated by a manual operation either for insertion into or removal from any of the holes or sockets 41—44. The base provides a series of horizontally aligned sockets and electrode prongs adjacent ones of which are connected to different electrodes and alternate ones of which are connected to the same electrode. If by any circumstance the wire plug terminals should be placed in alternate holes the error will be immediately indicated by energization of solenoid 13.

Having thus described my invention it will be seen that changes and modifications may be made therein by those skilled in the art without departing from the spirit and scope of the inven- tion and I do not wish to be limited to the details herein disclosed, but what I claim is:

1. In an electric weft detector system for a loom having an electric detector circuit, a supporting base made of insulating material, a pair of resilient electrodes on the base connected to each circuit, and a pair of weft detector units, one for each electrode, each unit comprising a tube having a detector finger slidably mounted therein, said unit being mounted on the base with the finger thereof electrically connected to the corresponding electrode and the latter resisting motion of said unit away from said base but yieldable to permit manual removal of said unit from said base while said electrode is connected to said circuit.

2. In an electric weft detector system for a loom having an electric detector circuit, a supporting base made of insulating material, a pair of resilient electrodes on the base connected to said circuit, and a pair of weft detector units, one for each electrode, each unit comprising a tube having a metallic slide bearing in which a metallic electric detector finger is slidably mounted, said base and units being so formed that said base holds the units normally in position with each electrode in electric contact with the corresponding bearing, each electrode and corresponding bearing having cooperating means preventing normal longitudinal movement of the unit relatively to the base, each unit due to the construction of its bearing and associated electrode being removable from said base by movement in a direction away from said electrode while the latter is connected to said circuit.

3. In an electric weft detecting system for a loom having a weft detecting circuit including two electric wires, means providing a series of horizontally aligned spaced sockets each provided with an electrode, the electrodes of certain of said sockets being electrically connected to each other and the electrodes of the remaining sockets being electrically connected to each other and insulated from the electrodes of said certain sockets, a pair of weft detector units each insertable into any of said sockets and in contact with the corresponding electrode, and a pair of terminals for said wires each insertable into any of said sockets and in contact with the corresponding electrode, said detector units when inserted one into one of said certain sockets and the other into one of said remaining sockets being electrically connected to said terminals, provided one of said terminals occupies one of said certain sockets and the other terminal occupies one of said remaining sockets.

4. In an electric weft detecting system for a loom having a weft detecting circuit including two electric wires, a pair of similar terminals, one for each of said wires, a pair of weft detector units independent of each other, and means providing a series of sockets each provided with an electrode and each capable of receiving a terminal or a detecting unit to contact the electrode thereof, the electrodes for certain of said sockets being electrically connected to each other and the electrodes for the remaining sockets being electrically connected to each other and insulated from the electrodes of said certain sockets, said detector units when inserted one into one of said certain sockets and one into one of said remaining sockets being electrically connected to said circuit provided one terminal is in one of said certain sockets and the other terminal is in one of said remaining sockets.

5. In an electric weft detecting system for a loom having a weft detecting circuit including two electric wires, a pair of sockets having electrically connected electrodes, one for each socket, a second pair of sockets having electrically connected electrodes, one for each of the last named sockets, insulated from the first named electrodes, terminal units one for each of said wires, and two weft detector units, each unit being insertable into any of said sockets for electric contact with the corresponding electrode, one of said terminal units and one of said detector units being in the first named pair of sockets, and the other of said terminal units and one of said detector units being in the second pair of sockets.

6. In an electric weft detecting system for a loom having a weft detecting circuit including two electric wires, a supporting base formed of insulating material having a top and a bottom, spaced horizontally aligned parallel horizontal sockets at least four in number formed in said base, electrically connected resilient electrodes registered with certain of said sockets and mounted on the top of said base, resilient electrically connected electrodes insulated from the first named electrodes and registered with the remaining sockets and mounted on the bottom of said base, plug terminals one for each of said wires, and two weft detector units, each terminal and each unit being insertable into any of said sockets to have electric contact with the corresponding electrode, said detector units when mounted in any two sockets one of which is of said certain sockets and the other of which is of said remaining sockets being electrically connected to said wires provided one of said plugs is in one of said certain sockets and the other plug is in one of said remaining sockets.

7. In an electric weft detecting system for a loom having a weft detecting circuit including two electric wires, a plug terminal for each of said wires, a pair of weft detector units, and supporting means for said terminals and units including a series of sockets each having an electrode, each terminal and unit being insertable into any socket and when in any socket having electric contact with the corresponding electrode, said electrodes being so related that when said units are inserted into certain of said sockets said units will be electrically connected to said wires provided said terminals are in certain other of said sockets.

8. In an electric weft detecting system for a loom having a weft detecting circuit including two electric wires, a base formed of insulating material and having four horizontally aligned parallel spaced sockets, electrically connected electrodes mounted on the base registering with the first and third of said sockets, other electrically connected electrodes mounted on the base and insulated from the first named electrodes and registering the second and fourth sockets, a wire terminal for each of said wires, and a pair of weft detector units, each terminal unit being insertable into each socket to contact the electrode thereof, said detector units when located in any two adjacent sockets being connected to said wires, one unit to each wire, when the terminals are in the other two sockets.

9. In an electric weft detecting system for a loom having a weft detecting circuit including two electric wires, a supporting base made of insulating material and having four horizontally spaced horizontally aligned parallel sockets, electrode means on said base having electrode contacts for the first and third sockets, other electrode means on said base insulated from the first electrode means and having electrodes for the second and fourth sockets, a plug terminal for each wire, and a pair of weft detector units, each plug and each unit being insertable into any socket to have engagement with the corresponding electrode, said detector units occupying two adjacent sockets and said plug terminals occupying the other two sockets.

10. In an electric weft detecting system for a loom having a weft detecting circuit including two electric wires, a base formed of insulating material and having four horizontally spaced horizontally extending sockets therein, a horizontally extending electrode adjacent to and registering with each socket, the electrodes of the first and third sockets being electrically connected to each other and supported by the base and the electrodes of the second and fourth sockets being electrically connected to each other and insulated from the electrodes for the first and third sockets and also supported by said base, a plug terminal for each of said wires insertable into any of said sockets for engagement with the corresponding electrode, and two weft detector units each insertable into any of said sockets for engagement with the corresponding electrode, said detector units being mountable on said base in any two adjacent sockets and the plugs being mountable on said base in the remaining two of said sockets.

11. A support for wire terminals and weft detector units forming part of a weft detecting system for a loom, said support comprising a base formed of insulating material and having at least four parallel aligned openings therein to receive said terminals and units, and two sets of electrodes for said openings, one of said sets being electrically connected together and registering with certain of said openings, and the other set of electrodes being electrically connected to each other and insulated from the first set and registering with other of said openings.

12. A support for wire terminals and weft detector units forming part of a weft detecting system for a loom, said support comprising a block of insulating material and having a top and a bottom between which extend a series of parallel aligned sockets, a set of electrically connected electrodes secured to the top of said block and having prongs registering with certain of said sockets, and another set of electrically connected electrodes secured to the bottom of said block and registering with other of said sockets.

13. A support for wire terminals and weft detector units forming part of a weft detecting system for a loom, said support comprising a block of insulating material having a top and a bottom between which extend a series of parallel horizontally spaced sockets, a set of electrically connected resilient electrodes mounted on the top of said block and registering with certain of said sockets and having downwardly extending detents, and a second set of electrically connected resilient electrodes secured to the bottom of the block and registering with other of said sockets and having upwardly extending detents.

14. In an electric weft detector for a loom, a base formed of insulating material and having a pair of horizontal sockets therein, a pair of resilient electrodes secured to said base, one for each socket, each electrode having a detent adjacent to the corresponding socket, and a pair of weft detector units, one for each socket, each unit including a tube and a bearing having a detent receiving groove and made of electric conducting material and an electric weft detector finger slidable in said bearing, each detector unit being insertable into the corresponding socket and movable therealong to cause the groove of the bearing thereof to register with the detent of the associate electrode.

15. In an electric weft detector for a loom, a base formed of insulating material having a pair of sockets therein, a pair of resilient electrodes each having a prong mounted on said base, one electrode for each socket, each electrode formed with a detent extending toward the axis of the corresponding socket, and a pair of weft detector units, one for each socket, each unit including a tube having a metallic slide bearing in one end thereof and having a metallic weft detector finger slidable in the tube and in said bearing, the latter having a retaining groove, each detector unit being insertable into and along the corresponding socket to cause entry of the associated detent into the groove thereof, each detent and corresponding groove cooperating to establish electric connection between the associated electrode and the detector finger therefor and also resist longitudinal movement of the unit in said socket.

16. In an electric weft detector system for looms having an electric detector circuit, a supporting base made of insulating material, a pair of resilient electrodes on the base insulated from each other and connected to said circuit, said base having a pair of sockets therein, one for each electrode, a detent on each electrode adjacent to the corresponding socket, and a pair of weft detector units, one in each socket, each unit comprising a tube having a detector slidably mounted therein and formed with a retaining groove into which fits the detent of the corresponding electrode, each electrode establishing electrical contact with the corresponding detector unit and also resisting longitudinal movement of the unit in the socket therefor.

RICHARD G. TURNER.

REFERENCES CITED

The following references are of record in the file of this patent:

UNITED STATES PATENTS

| Number | Name | Date |
|---|---|---|
| 681,165 | Baker | Aug. 20, 1901 |
| 747,146 | Cowell | Dec. 15, 1903 |
| 1,833,610 | Jackson | Nov. 24, 1931 |
| 1,924,197 | Payne | Aug. 29, 1933 |
| 2,283,105 | Turner | May 12, 1942 |